(12) United States Patent
Ito et al.

(10) Patent No.: US 8,824,388 B2
(45) Date of Patent: Sep. 2, 2014

(54) BASE STATION, TERMINAL DEVICE, CONTROL CHANNEL ASSIGNMENT METHOD AND REGION SIZE DETERMINATION METHOD

(75) Inventors: Akira Ito, Kawasaki (JP); Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 13/093,408

(22) Filed: Apr. 25, 2011

(65) Prior Publication Data
US 2011/0199995 A1   Aug. 18, 2011

Related U.S. Application Data

(63) Continuation of application No. PCT/JP2008/069804, filed on Oct. 30, 2008.

(51) Int. Cl.
*H04W 4/00* (2009.01)
*H04L 5/00* (2006.01)
*H04W 72/04* (2009.01)

(52) U.S. Cl.
CPC ............... *H04L 5/00* (2013.01); *H04W 72/042* (2013.01); *H04W 72/0453* (2013.01)
USPC .......................................... 370/329; 455/450

(58) Field of Classification Search
None
See application file for complete search history.

(56) References Cited

U.S. PATENT DOCUMENTS

| | | | |
|---|---|---|---|
| 2003/0072296 A1 | 4/2003 | Odenwalder et al. | |
| 2007/0286112 A1* | 12/2007 | Prakash et al. | 370/319 |
| 2009/0003274 A1* | 1/2009 | Kwak et al. | 370/329 |
| 2010/0309891 A1* | 12/2010 | Kuchibhotla et al. | 370/336 |
| 2011/0143796 A1* | 6/2011 | Lee et al. | 455/507 |
| 2011/0194514 A1* | 8/2011 | Lee et al. | 370/329 |

FOREIGN PATENT DOCUMENTS

CN    1722890    1/2006

OTHER PUBLICATIONS

NTT DoCoMo, Inc.; "Measurement gap control principles"; Agenda Item: 5.10.2; 3GPP TSG RAN WG2 #57bis; Tdoc-R2-071307; St. Julian's, Malta; Mar. 26-30, 2007.
NTT DoCoMo, Inc.; "Measurement gap control"; Agenda Item: 4.6; 3GPP TSG RAN WG2 #59; Tdoc-R2-073369; Athens, Greece; Aug. 20-24, 2007.
Office Action issued for corresponding Japanese Patent Application No. 2010-535578, mailed Sep. 4, 2012, with English translation.
International Search Report issued for corresponding International Patent Application No. PCT/JP2008/069804, mailed Dec. 22, 2008.

(Continued)

*Primary Examiner* — Mohammad Adhami
(74) *Attorney, Agent, or Firm* — Myers Wolin, LLC

(57) ABSTRACT

In a base station that performs radio data communication with terminal devices by using a plurality of bands of which each has a data channel region to which a data channel is assigned and a control channel region to which a control channel is assigned, the base station includes a control channel assigning unit that assigns a control channel for the terminal device at a location corresponding to a band to which a data channel assigned to the terminal device belongs, in the control channel region of any band of the plurality of bands, and a control channel transmitting unit that transmits the control channel to the terminal device at the location assigned by the control channel assigning unit.

12 Claims, 15 Drawing Sheets

(56) References Cited

OTHER PUBLICATIONS

NEC Group; "Downlink Control Structure for Carrier Aggregation Approach in LTE-Advanced System"; 3GPP TSG-RAN WG1#54bis R1-083491; Fig. 2, Oct. 3, 2008; [Ref.: ISR mailed 12.22.2008].

NTT DOCOMO; "DL Layered Control Signal Structure in LTE-Advanced"; 3GPP TSG-RAN WG1#54bis R1-083681; Oct. 3, 2008; [Ref.: ISR mailed 12.22.2008].

Ericsson; "Carrier aggregation in LTE-Advanced"; 3GPP TSG-RAN WG1#53bis R1-082468; Jul. 4, 2008; [Ref.: ISR mailed 12.22.2008].

NEC Group; "Downlink Control Structure for Carrier Aggregation Approach in LTE-Advanced System"; Agenda Item: 11; R1-083491; TSG-RAN WG1#54Bis; Prague, Czech Republic; Sep. 29-Oct. 3, 2008.

NTT DOCOMO; "DL Layered Control Signal Structure in LTE-Advanced"; Agenda Item: 11; R1-083681; 3GPP TSG RAN WG1 Meeting #54bis; Prague, Czech Republic; Sep. 29-Oct. 3, 2008.

Notice of Preliminary Rejection issued for corresponding Korean Patent Application No. 10-2011-7009725, dated Aug. 21, 2012, with partial English translation.

First Notification of Office Action issued for corresponding Chinese Patent Application No. 200880131779.3, issued May 6, 2013, with English translation.

* cited by examiner

| TERMINAL DEVICE NAME | MAIN CARRIER |
|---|---|
| TERMINAL DEVICE 2a | COMPONENT CARRIER 300a |
| TERMINAL DEVICE 2b | COMPONENT CARRIER 300b |
| TERMINAL DEVICE 2c | COMPONENT CARRIER 300c |

BASE STATION, TERMINAL DEVICE, CONTROL CHANNEL ASSIGNMENT METHOD AND REGION SIZE DETERMINATION METHOD

CROSS-REFERENCE TO RELATED APPLICATION

This application is a continuation of International Application No. PCT/JP2008/069804, filed on Oct. 30, 2008, the entire contents of which are incorporated herein by reference.

FIELD

The embodiments discussed herein are directed to a base station, a terminal device, a control channel assignment method, and a region size determination method.

BACKGROUND

In these years, 3GPP (Third Generation Partnership Project) completes the standardization of LTE (Long Time Evolution) that is one of high-speed data communication specifications and starts the standardization of LTE-Advanced that is an evolved system. The LTE-Advanced system targets the further increase of throughput. In other words, the LTE-Advanced system can perform communication by using a maximum bandwidth of 100 MHz when the LTE system performs communication by using a maximum system bandwidth of 20 MHz.

Moreover, the LTE-Advanced system is required to have compatibility with the LTE system, and a terminal device that employs the LTE system is required to be connected to a network of the LTE-Advanced system. To meet these demands, some consider forming one LTE-Advanced system band by bundling LTE system bands.

An example of a radio format of the LTE system is illustrated in FIG. 20. As illustrated in FIG. 20, an LTE system band 600 is divided into a control channel region 610 and a data channel region 620. The control channel region 610 includes therein a control channel 611. A terminal device transmits and receives various types of data at a predetermined resource location in the data channel region 620 on the basis of the control channel 611.

For example, when the control channel 611 is a control channel for downlink data assignment, the terminal device receives a data channel in the data channel region 620 which is located at a resource location designated by the control channel 611. On the other hand, when the control channel 611 is a control channel for uplink data assignment, the terminal device transmits data in the data channel region 620, at a resource location designated by the control channel.

Next, an example of a radio format of an LTE-Advanced system obtained by bundling three system bands of the LTE system is illustrated in FIG. 21 as an example of the LTE-Advanced system. Hereinafter, LTE system bands of the LTE-Advanced system are referred to as component carriers. As illustrated in FIG. 21, component carriers 700a to 700c respectively have control channel regions 710a to 710c and data channel regions 720a to 720c.

In the LTE-Advanced system, a terminal device transmits and receives data on the basis of a control channel similarly to the LTE system. In this case, in the LTE-Advanced system, control channels corresponding to the component carriers are included in the control channel region of one component carrier. For example, as illustrated in FIG. 21, a control channel 730a corresponding to the component carrier 700a, a control channel 730b corresponding to the component carrier 700b, and a control channel 730c corresponding to the component carrier 700c are all included in the control channel region 710b of the component carrier 700b.

In this way, the LTE-Advanced system previously decides one component carrier among the component carriers 700 as the one which has all the control channels 730 to be acquired by a certain terminal device. As a result, the terminal device can acquire control channels that correspond to all the component carriers 700 only by accessing the control channel region 710 of one of the component carriers 700 (see 3GPP TSG-RAN WG1#53bis, R1-082468, "Carrier aggregation in LTE-Advanced").

When the LTE-Advanced system as described above is employed, the control channel has to carry information indicating which of the component carriers corresponds to this control channel, and therefore an amount of information included in the control channel increases. As a result, there is a possibility that an utilizable data channel region decreases and thus frequency use efficiency decreases as the whole system.

SUMMARY

According to an aspect of an embodiment of the invention, in a base station that performs radio data communication with terminal devices by using a plurality of bands of which each has a data channel region to which a data channel is assigned and a control channel region to which a control channel is assigned, the base station includes a control channel assigning unit that assigns a control channel for the terminal device at a location corresponding to a band to which a data channel assigned to the terminal device belongs, in the control channel region of any band of the plurality of bands, and a control channel transmitting unit that transmits the control channel to the terminal device at the location assigned by the control channel assigning unit.

According to another aspect of an embodiment of the invention, in a terminal device that performs radio data communication with a base station by using a plurality of bands of which each has a data channel region to which a data channel is assigned and a control channel region to which a control channel is assigned, the terminal device includes a control channel receiving unit that receives, from the base station, a control channel assigned to a control channel region of a band to which a control channel for the terminal device is assigned, and a data channel receiving unit that receives a data channel at an assignment location indicated by the control channel in a data channel region of a band corresponding to a location to which the control channel received by the control channel receiving unit is assigned in the control channel region.

According to still another aspect of an embodiment of the invention, in a method for assigning a control channel to a control channel region by using a plurality of bands of which each has a data channel region to which a data channel is assigned and a control channel region to which a control channel is assigned when radio data communication is performed between a base station and a terminal device, the method includes assigning, by the base station, a control channel for the terminal device at a location corresponding to a band to which a data channel assigned to the terminal device belongs, in the control channel region of any band of the plurality of bands.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Exemplary embodiments of a base station, a terminal device, a control channel assignment method, and a region size determination method according to the present invention will be explained below in detail with reference to the accompanying drawings.

[a] First Embodiment

Figure 1:
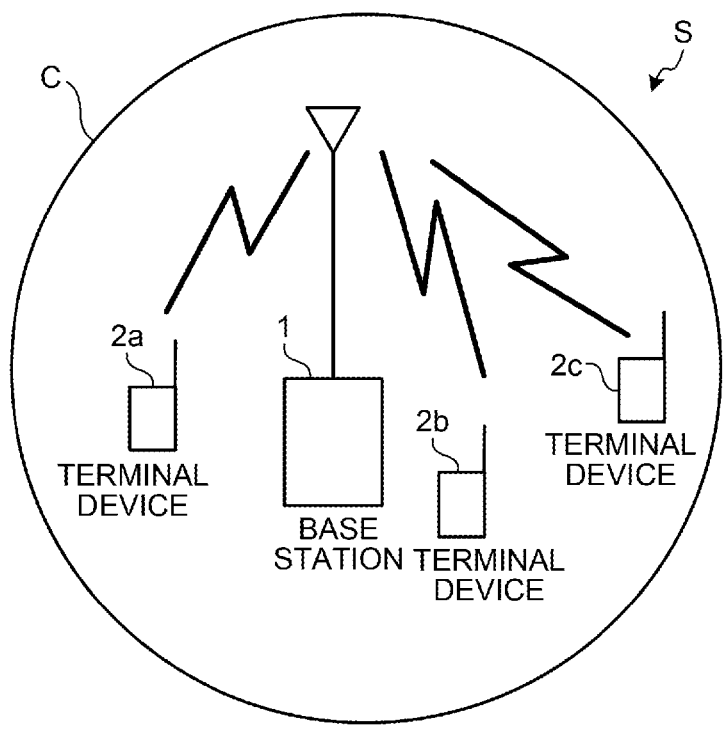
FIG. 1 is a schematic diagram explaining a radio communication system according to a first embodiment.

First, it will be explained about the configuration of a radio communication system including a base station according to the first embodiment with reference to the drawings. FIG. 1 is a schematic diagram explaining a radio communication system according to the first embodiment. As illustrated in FIG. 1, the radio communication system S according to the first embodiment includes a base station 1 and a plurality of terminal devices 2a to 2c. The base station 1 performs radio data communication, such as downlink communication transmitting signals from the base station 1 to each of the terminal devices 2a to 2c and uplink communication transmitting signals from each of the terminal devices 2a to 2c to the base station 1, with the terminal devices 2a to 2c located in a cell C that is a communication range.

Figure 2:
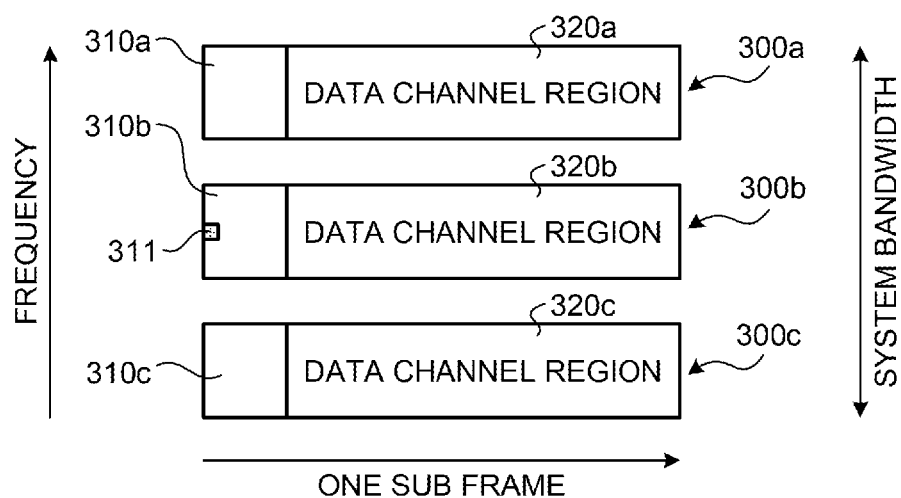
FIG. 2 is a diagram illustrating a configuration example of a radio format according to the first embodiment.

In the first embodiment, radio data communication between the base station 1 and the terminal devices 2 is performed by using different frequency bands. Specifically, the radio communication system S according to the first embodiment performs radio data communication that uses three LTE system bands. Hereinafter, it will be explained about the configuration of a radio format that is used in the radio communication system S according to the first embodiment. FIG. 2 is a diagram illustrating a configuration example of a radio format according to the first embodiment.

As illustrated in FIG. 2, the radio format that is used in the radio communication system S is formed by bundling three system bands 300a to 300c of the LTE system. Hereinafter, the system bands 300a to 300c of the LTE system are respectively referred to as component carriers 300a to 300c. In this case, the number of the component carriers 300 is not limited to three.

The format of each of the component carriers 300a to 300c is defined by one subframe unit. The component carriers respectively include control channel regions 310a to 310c and data channel regions 320a to 320c. The control channel regions 310 are regions to which control channels are assigned, and the data channel regions 320 are regions to which data channels are assigned.

A data channel is a divided area (channel) obtained by dividing the data channel region 320 by a predetermined time interval and is assigned to each of the terminal devices 2. Moreover, a control channel includes information that indicates the assignment location of data channel in the data channel region 320. The terminal device 2 transmits and receives data by using a data channel for itself that is assigned in the data channel region 320. The control channel according to the first embodiment does not include information that indicates which of the three component carriers 300a to 300c a data channel is assigned to.

In the radio communication system S according to the first embodiment, the component carriers 300a to 300c have high frequency bands in the order of the component carrier 300c→the component carrier 300b→the component carrier 300a. Each of the component carriers 300a to 300c independently forms one LTE system. The radio communication system S can also perform radio data communication that uses one of the component carriers 300.

Figure 3:
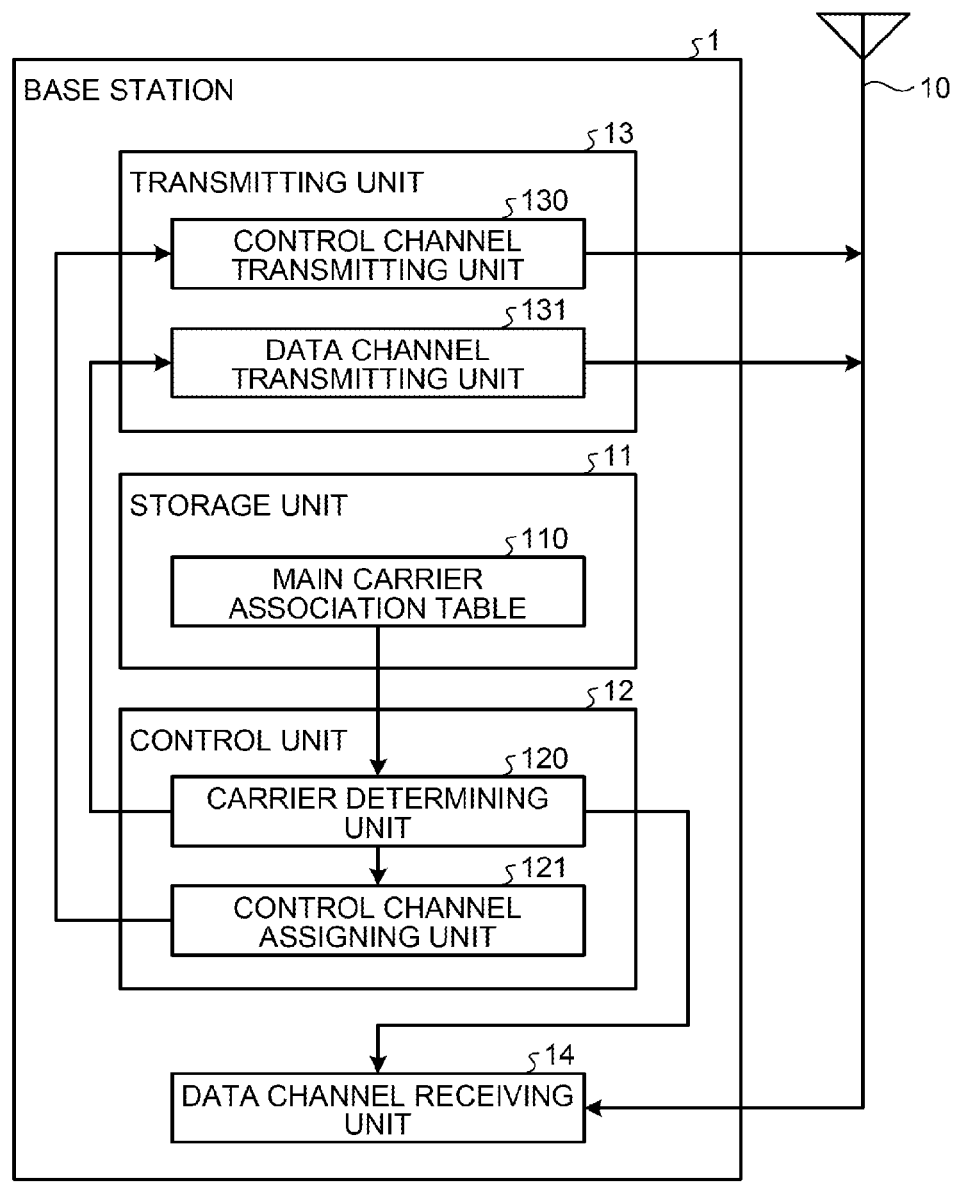
FIG. 3 is a block diagram illustrating the configuration of a base station according to the first embodiment.
Figures 4, 5:
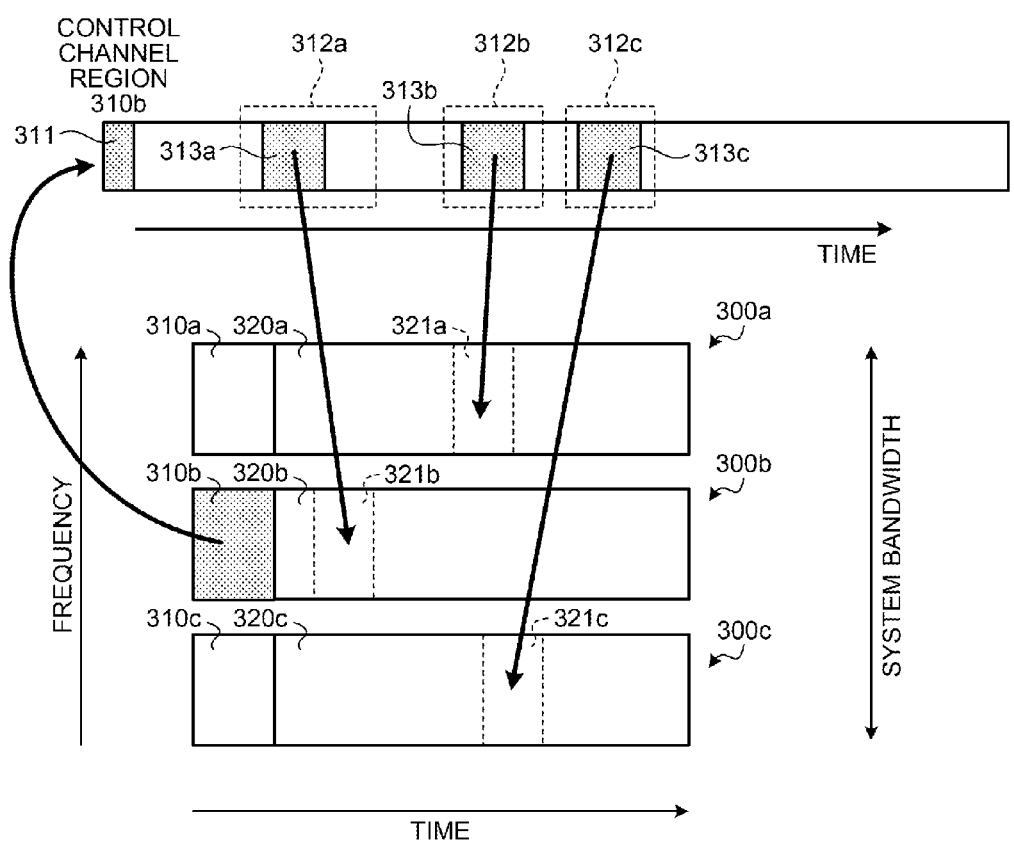
FIG. 4 is a diagram illustrating an example of a main carrier association table according to the first embodiment.
FIG. 5 is a diagram explaining a control channel assignment method according to the first embodiment.

Next, it will be explained about the configuration of the base station 1 according to the first embodiment. FIG. 3 is a block diagram illustrating the configuration of the base station 1 according to the first embodiment. FIG. 4 is a diagram illustrating an example of a main carrier association table according to the first embodiment. As illustrated in FIG. 3, the base station 1 according to the first embodiment includes an antenna 10, a storage unit 11, a control unit 12, a transmitting unit 13, and a data channel receiving unit 14.

The antenna 10 is used for transmitting and receiving various types of data. In the first embodiment, the antenna 10 is particularly used when transmitting a control channel or a data channel to the terminal device 2 or when receiving a data channel from the terminal device 2.

The storage unit 11 stores therein the device names of the terminal devices 2, the frequency bands of the component carriers 300a to 300c, and the like, as various types of information that is used for radio data communication with the terminal devices 2. The storage unit 11 particularly stores a main carrier association table 110. The main carrier association table 110 stores the component carriers 300 of the component carriers 300a to 300c, to which the control channels for the terminal devices 2 are respectively assigned, in association with the terminal devices 2.

In other words, in the first embodiment, the terminal devices 2a to 2c do not detect all the control channel regions 310a to 310c of the component carriers 300a to 300c but detect only the one predetermined control channel region 310. Therefore, the base station 1 sets the component carrier 300 having a control channel, to which the control channel for the certain terminal device 2 is assigned, as the main carrier of this terminal device 2, and manages a correspondence relationship between the terminal devices 2 and main carriers by using the main carrier association table 110.

For example, as illustrated in FIG. 4, the main carrier of the terminal device 2a is the component carrier 300a. In other words, the terminal device 2a receives only the control channel assigned to the control channel region 310a of the component carrier 300a. Similarly, the main carrier of the terminal device 2b is the component carrier 300b and the main carrier of the terminal device 2c is the component carrier 300c.

The control unit 12 controls the whole of the base station 1. The control unit 12 includes a carrier determining unit 120 and a control channel assigning unit 121. The carrier determining unit 120 determines which location of which component carrier 300 a data channel for the certain terminal device 2 is assigned at. Specifically, the carrier determining unit 120 determines, from the component carriers 300a to 300c, the component carriers 300, to which data channels for each of the terminal devices 2 are assigned, in an ascending order of frequency bands of the component carriers 300 by using the main carrier of the terminal device 2 as a starting point.

For example, when transmitting one data to the terminal device 2c, the carrier determining unit 120 assigns a data channel for the terminal device 2c to the data channel region 320c of the component carrier 300c that is the main carrier of the terminal device 2c. Moreover, when transmitting two data to the terminal device 2c, the carrier determining unit 120 determines, as the component carriers 300 to which data channels corresponding to these data are assigned, the component carrier 300c that is the main carrier of the terminal device 2c and the component carrier 300b that has a high frequency band next to the component carrier 300c.

The control channel assigning unit 121 assigns a control channel corresponding to a data channel for the terminal device 2 at a location corresponding to the component carrier 300 to which the data channel is assigned, in the control channel region 310 of the main carrier of this terminal device 2. Specifically, the control channel assigning unit 121 determines the assignment location of a control channel on the basis of the frequency band of the component carrier 300 to which a data channel corresponding to this control channel is assigned.

Hereinafter, it will be explained about a specific assignment method of a control channel according to the first embodiment. FIG. 5 is a diagram explaining a control channel assignment method according to the first embodiment. In this case, a control channel 313a corresponds to a data channel assigned at an assignment location 321b in the component carrier 300b and a control channel 313b corresponds to a data channel assigned at an assignment location 321a in the component carrier 300a. Moreover, a control channel 313c corresponds to a data channel assigned at an assignment location 321c in the component carrier 300c.

As illustrated in FIG. 5, the control channels 313a to 313c for the terminal device 2b that uses the component carrier 300b as a main carrier are assigned in the control channel region 310b of the component carrier 300b. Moreover, a control channel region identifier 311 that is information that indicates a boundary location between the control channel region 310b and the data channel region 320b is assigned to the head of the control channel region 310b.

When communicating with the base station 1, the terminal device 2b first decodes the control channel region identifier 311 located in the control channel region 310b of the main carrier of the device itself in order to identify the size of the control channel region 310b, the starting position of the data channel region 320b, and the like. In the first embodiment, the control channel region identifier 311 assigned to the control channel region 310b is applied to all the component carriers 300a to 300c. In other words, the terminal device 2b decodes the control channel region identifier 311 located at the control channel region 310b in order to identify boundary locations between the control channel regions 310a to 310c and the data channel regions 320a to 320c of all the component carriers 300a to 300c.

Moreover, one or a plurality of search spaces different for each terminal device 2 is assigned in the control channel region 310. A search space is a region in the control channel region 310 and is arranged to be detected (received) by a certain terminal device 2. For example, as illustrated in FIG. 5, search spaces 312a to 312c are assigned in the control channel region 310b as regions to be detected by the terminal device 2b.

The control channel assigning unit 121 assigns the control channels 313a to 313c corresponding to the data channels for the terminal device 2b (including the assignment location information of the data channels) to the search spaces 312a to 312c. In this case, the control channel assigning unit 121 determines which of the search spaces 312 which control channel is assigned to on the basis of the frequency band of the component carrier 300 to which the data channel is assigned.

In other words, the control channel assigning unit 121 first assigns the control channel 313a corresponding to the data channel assigned to the main carrier (the component carrier 300b) of the terminal device 2b to the search space 312a first detected by the terminal device 2b among the search spaces 312a to 312c. Next, the control channel assigning unit 121 assigns a control channel, which corresponds to the data channel assigned to the component carrier 300a having a high frequency band next to the component carrier 300b, to the search space 312b next detected by the terminal device 2b.

Because the component carrier 300 having a higher frequency band than that of the component carrier 300a does not exist, the control channel assigning unit 121 assigns the control channel 313c corresponding to the component carrier 300c having the lowest frequency band to the search space 312c next detected by the terminal device 2b.

In this way, the control channel assigning unit 121 first sets the control channel 313 first detected by the terminal device 2 as a control channel corresponding to the data channel assigned to the main carrier. Then, the control channel assigning unit 121 assigns the other control channels 313 at locations at which the sequence of detection of the control channels 313 of the terminal device 2 is associated with in the ascending order of frequency bands of the component carriers 300 corresponding to the control channels 313.

The transmitting unit 13 transmits the control channel and the data channel to the terminal device 2 via the antenna 10. The transmitting unit 13 includes a control channel transmitting unit 130 and a data channel transmitting unit 131. The control channel transmitting unit 130 transmits the control channel 313 to the terminal device 2 at the location assigned by the control channel assigning unit 121. Moreover, the data channel transmitting unit 131 transmits the data channel to the terminal device 2 at the determined assignment location of the component carrier 300 determined by the carrier determining unit 120.

The data channel receiving unit 14 receives the data channel transmitted from the terminal device 2 via the antenna 10 at the determined assignment location of the component carrier 300 determined by the carrier determining unit 120.

Figure 6:
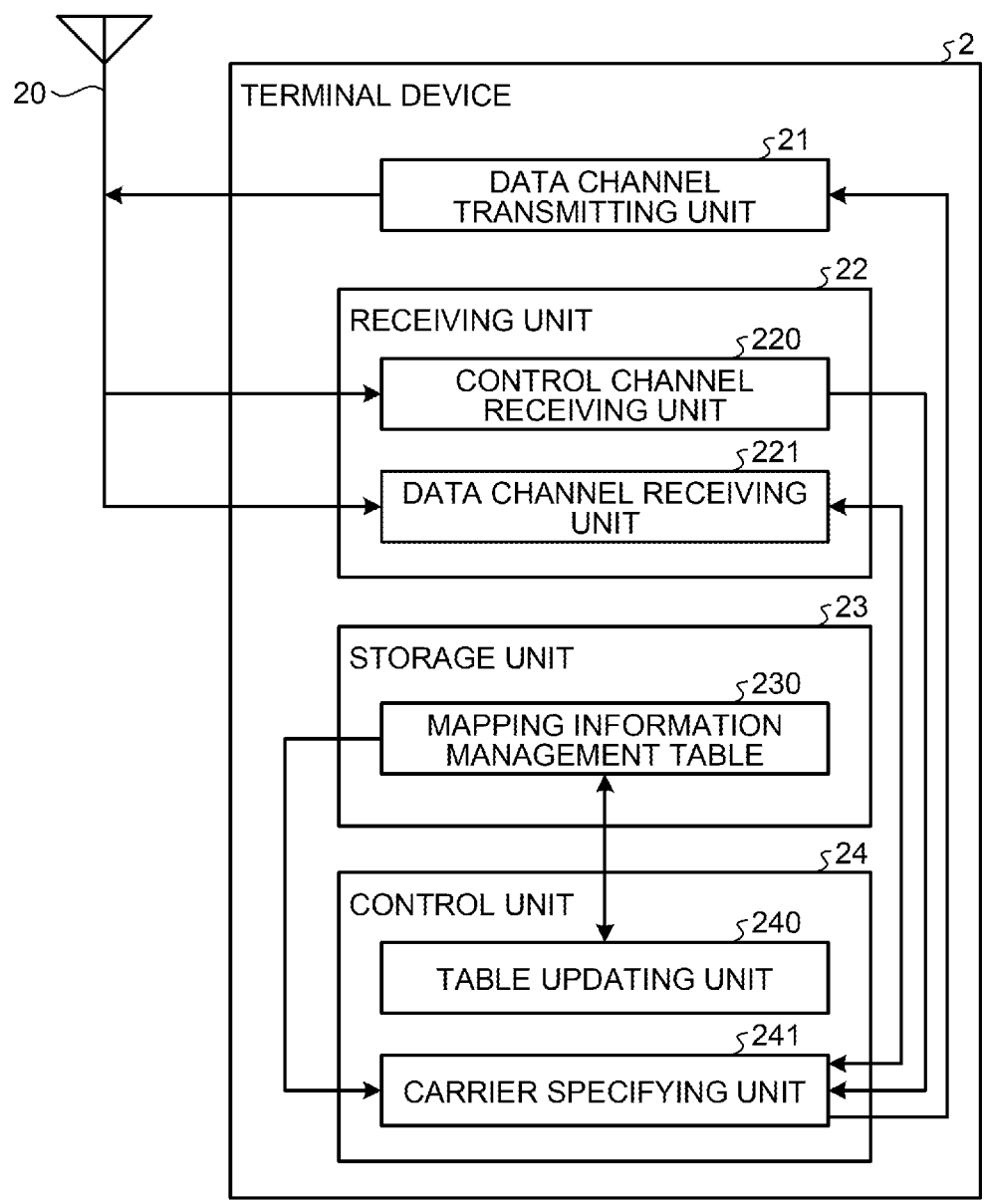
FIG. 6 is a block diagram illustrating the configuration of a terminal device according to the first embodiment.

Next, it will be explained about the configuration of the terminal device 2 according to the first embodiment. FIG. 6 is a block diagram illustrating the configuration of the terminal device 2 according to the first embodiment. As illustrated in FIG. 6, the terminal device 2 according to the first embodiment includes an antenna 20, a data channel transmitting unit 21, a receiving unit 22, a storage unit 23, and a control unit 24.

The antenna 20 is used for transmitting and receiving various types of data. In the first embodiment, the antenna 20 is particularly used when a control channel or a data channel is received from the base station 1 or when a data channel is transmitted to the base station 1.

The receiving unit 22 receives a control channel and a data channel from the base station 1 via the antenna 20. The receiving unit 22 includes a control channel receiving unit 220 that receives a control channel and a data channel receiving unit 221 that receives a data channel.

The storage unit 23 stores therein various types of information that is used for radio data communication with the base station 1. The storage unit 23 particularly stores a mapping information management table 230. The mapping information management table 230 stores a main carrier of the device itself and a correspondence relationship between the component carrier 300 and the assignment location of a control channel in the control channel region 310 of the main carrier. For example, the mapping information management table 230 stored in the storage unit 23 of the terminal device 2b stores, as the information on the main carrier, that a main carrier is the component carrier 300b. Moreover, the mapping information management table 230 of the terminal device 2b stores that the sequence of detection of control channels is associated with the ascending order of frequency bands of the component carriers 300 corresponding to the control channels.

The control unit 24 controls the whole of the terminal device 2. The control unit 24 includes a table updating unit 240 and a carrier specifying unit 241. The table updating unit 240 corresponds to an information updating unit, and modifies the information of the mapping information management table 230 in accordance with the request of the base station 1. Specifically, the table updating unit 240 modifies a correspondence relationship between the component carrier and the assignment location of a control channel in the control channel region 310 of the main carrier of the device itself.

The carrier specifying unit 241 corresponds to a band specifying unit, and specifies the component carrier 300 to which a data channel corresponding to this control channel is assigned on the basis of the assignment location of the received control channel in the control channel region and the mapping information management table 230. For example, the carrier specifying unit 241 of the terminal device 2b specifies that the control channel 313a in the search space 312a first detected by the terminal device 2b, among the search spaces 312a to 312c in the control channel region 310b of the main carrier, is a control channel corresponding to the data channel assigned to the main carrier.

Next, the carrier specifying unit 241 specifies that the control channel 313b in the next search space 312b is a control channel corresponding to the data channel assigned to the component carrier 300a that has a high frequency band next to the main carrier. Moreover, because a component carrier having a frequency band higher than that of the component carrier 300a does not exist, the carrier specifying unit 241 specifies that the control channel 313c in the next search space 312c is a control channel corresponding to the data channel assigned to the lowest component carrier 300c in the system.

Figure 7:
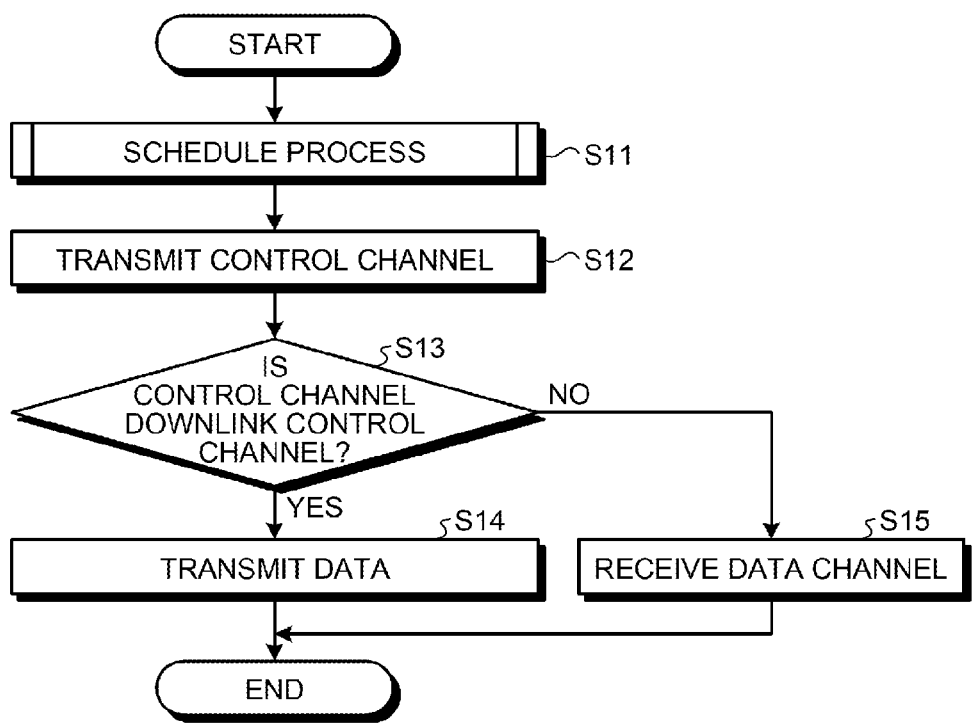
FIG. 7 is a flowchart illustrating an example of processing procedures performed by the base station according to the first embodiment.

Next, it will be explained about specific operations of the base station 1 according to the first embodiment with reference to the drawing. FIG. 7 is a flowchart illustrating an example of processing procedures performed by the base station 1 according to the first embodiment. In FIG. 7, among the processing procedures that are performed by the base station 1, only processing procedures on the transmission of a control channel and the transmission and reception of a data channel to and from the one terminal device 2 are illustrated.

As illustrated in FIG. 7, the control unit 12 of the base station 1 first performs a schedule process (Step S11). The schedule process for performing scheduling on a transmission timing etc. of a control channel or a data channel for the terminal device 2 will be described below. Next, the control unit 12 transmits a control channel to the terminal device 2 on the basis of the scheduling result at Step S11 (Step S12).

Next, the control unit 12 determines whether the control channel transmitted at Step S12 is a downlink control channel from the base station 1 to the terminal device 2 (Step S13). In the process, when it is determined that the control channel transmitted at Step S12 is a downlink control channel (Step S13: YES), the control unit 12 transmits data to the terminal device 2 at an assignment location based on the scheduling result at Step S11 (Step S14). On the other hand, when the control channel transmitted at Step S12 is not a downlink control channel, in other words, when the control channel is an uplink control channel (Step S13: NO), the control unit 12 receives a data channel at the assignment location based on the scheduling result (Step S15).

Figure 8:
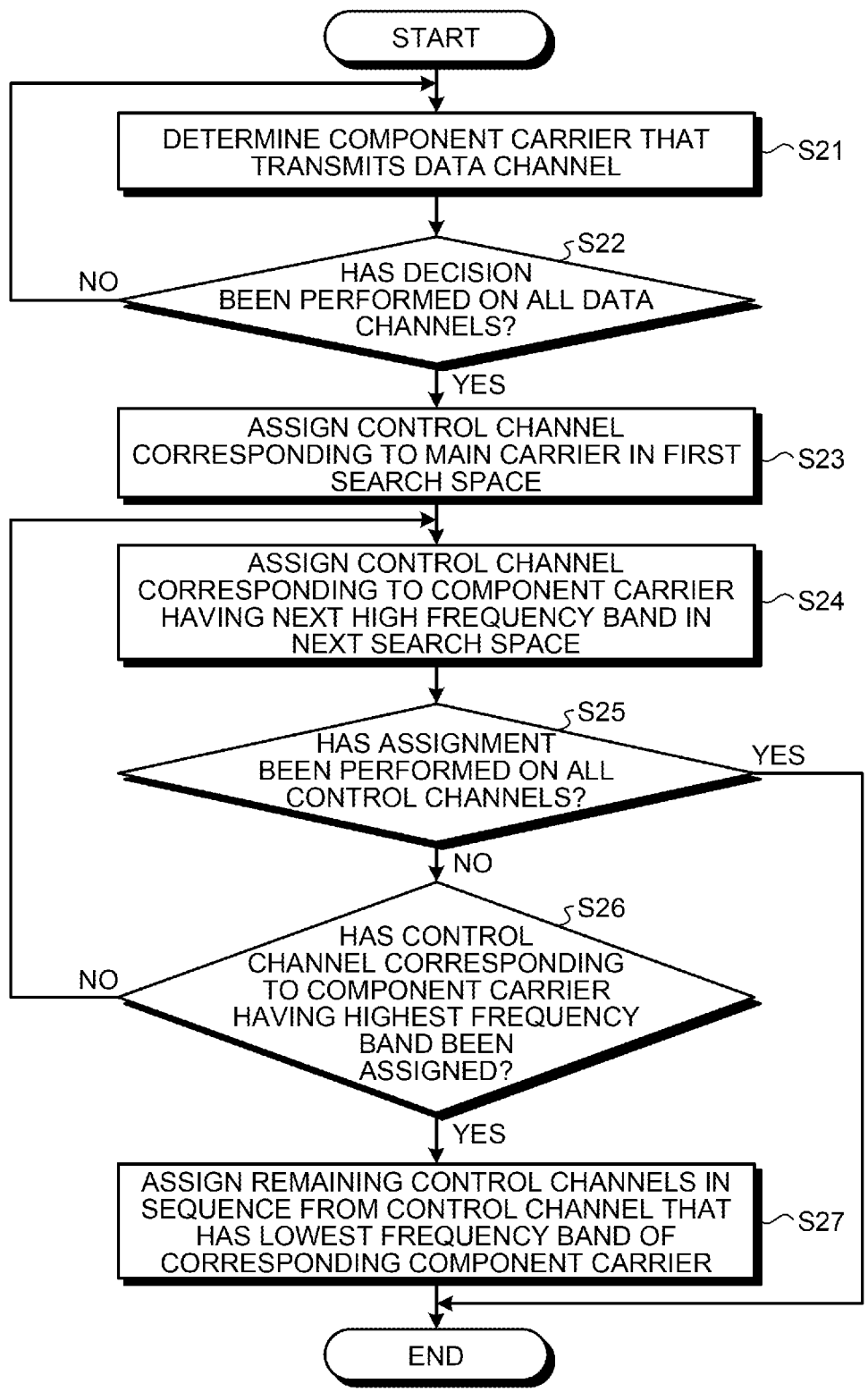
FIG. 8 is a flowchart illustrating an example of processing procedures of a schedule process according to the first embodiment.

Next, it will be explained about the schedule process at Step S11 with reference to the drawing. FIG. 8 is a flowchart illustrating an example of processing procedures of the schedule process according to the first embodiment.

As illustrated in FIG. 8, the carrier determining unit 120 determines the component carrier 300 that transmits a data channel (Step S21). Specifically, the carrier determining unit 120 determines, from the component carriers 300a to 300c, the component carrier 300 to which a data channel for each of the terminal devices 2 is assigned in an ascending order of frequency bands of the component carriers 300 by using the main carrier of this terminal device 2 as a starting point.

Next, the carrier determining unit 120 determines whether the component carrier 300 for transmission is decided for all the data channels (Step S22). In the process, when there is a data channel on which the decision of the component carrier 300 for transmission is not yet performed (Step S22: NO), the carrier determining unit 120 shifts the process to Step S21. On the other hand, when it is determined that the decision of the component carrier 300 for transmission has been performed on all the data channels (Step S22: YES), the carrier determining unit 120 shifts the process to Step S23.

At Step S23, the control channel assigning unit 121 assigns the control channel corresponding to the data channel assigned to the main carrier of the terminal device 2 in the search space 312 first detected by the terminal device 2 among the search spaces 312 assigned to the terminal device 2 in the control channel region 310 of the main carrier (Step S23). Next, the control channel assigning unit 121 assigns the control channel corresponding to the component carrier 300 having a high frequency band next to the main carrier in the search space 312 next detected by the terminal device 2 (Step S24).

Next, the control channel assigning unit 121 determines whether the assignment to the search space 312 has been performed on all the control channels (Step S25). In the process, when there is a control channel on which the assignment to the search space 312 is not yet performed (Step S25: NO), the control channel assigning unit 121 shifts the process to Step S26.

At Step S26, the control channel assigning unit 121 determines whether the control channel corresponding to the component carrier having the highest frequency band has been assigned in the search space 312. In the process, when the control channel is not assigned in the search space 312 (Step S26: NO), the control channel assigning unit 121 shifts the process to Step S24. On the other hand, when it is determined that the control channel is assigned in the search space 312 (Step S26: YES), the control channel assigning unit 121 shifts the process to Step S27.

At Step S27, the control channel assigning unit 121 assigns the remaining control channels to the search space 312 in sequence from the control channel that has the lowest frequency band of the corresponding component carrier 300. When the process is finished or when it is determined at Step S25 that the assignment to the search space 312 is already performed on all the control channels (Step S25: YES), the control channel assigning unit 121 terminates the schedule process.

Figure 9:
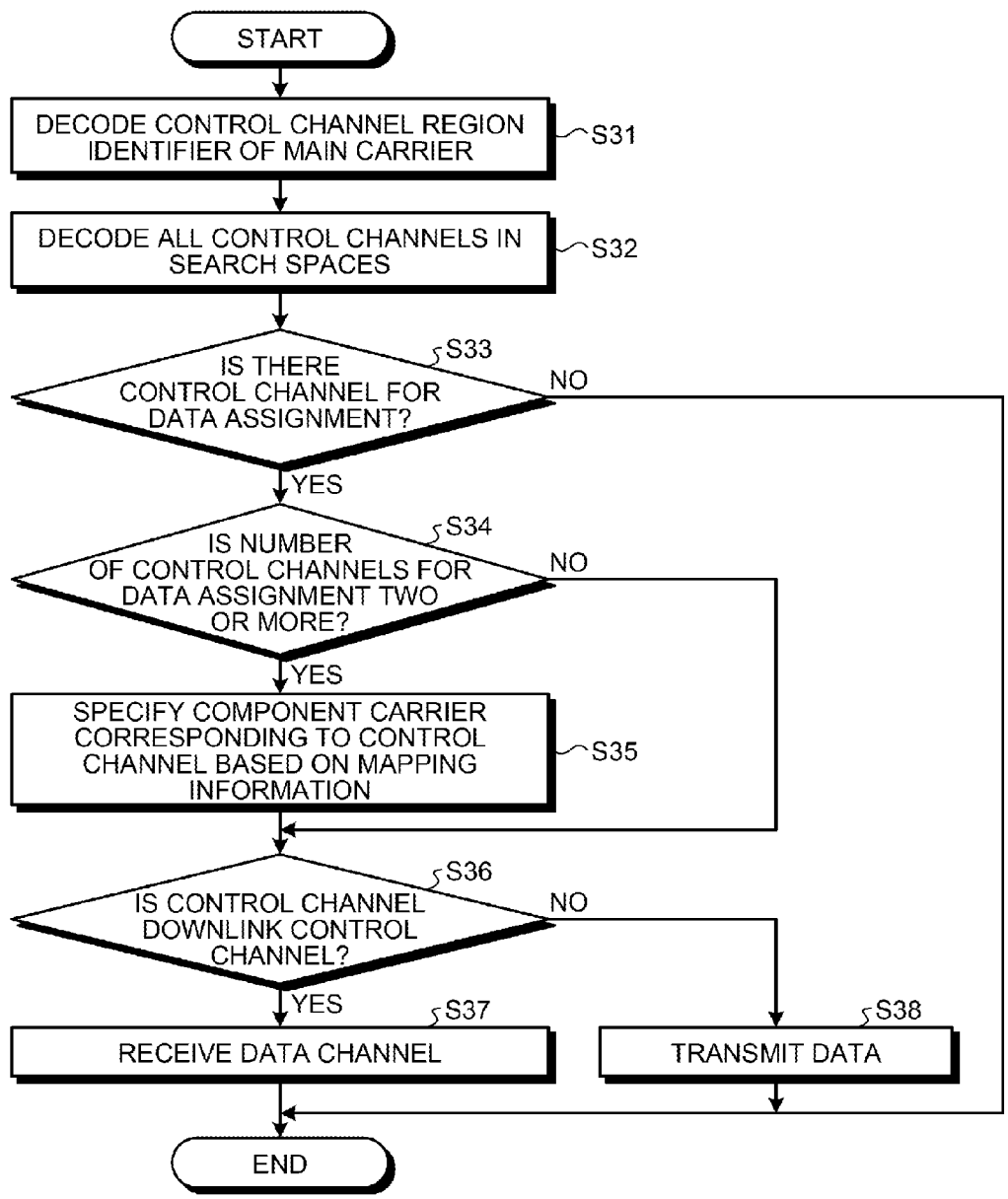
FIG. 9 is a flowchart illustrating an example of processing procedures performed by the terminal device according to the first embodiment.

Next, it will be explained about specific operations of the terminal device 2 according to the first embodiment. FIG. 9 is a flowchart illustrating an example of processing procedures performed by the terminal device according to the first embodiment. In FIG. 9, only processing procedures on the reception of a control channel and the transmission and reception of a data channel are illustrated among the processing procedures that are performed by the terminal device 2.

As illustrated in FIG. 9, the control unit 24 of the terminal device 2 detects the control channel region identifier 311 located in the control channel region 310 of the main carrier of the device itself and decodes the control channel region identifier 311 (Step S31). Next, the control unit 24 receives all the control channels in the search spaces 312 assigned to the device itself and decodes all the control channels (Step S32).

Next, the control unit 24 determines whether a control channel for data assignment exists among the control channels decoded at Step S32 (Step S33). In the process, when it is determined that a control channel for data assignment exists (Step S33: YES), the control unit 24 shifts the process to Step S34.

At Step S34, the control unit 24 determines whether the number of control channels for data assignment is two or more or not. In the process, when it is determined that the number of control channels for data assignment is two or more (Step S34: YES), the control unit 24 shifts the process to Step S35.

At Step S35, the carrier specifying unit 241 specifies the component carrier 300 to which the data channel corresponding to each control channel is assigned on the basis of the mapping information stored in the mapping information management table 230. Specifically, the carrier specifying unit 241 specifies the control channel 313 located in the search space 312, first detected by the device itself, among the search spaces 312 in the control channel region 310 of the main carrier as a control channel corresponding to the data channel assigned to the main carrier.

The carrier specifying unit 241 specifies the control channel 313 in the next search space 312 as a control channel corresponding to the data channel assigned to the component carrier 300 that has a high frequency band next to the main carrier. Moreover, when specifying the control channel corresponding to the component carrier that has the highest frequency band, the carrier specifying unit 241 specifies the control channel 313 in the next search space 312 as a control channel corresponding to the data channel assigned to the lowest component carrier 300 in the system.

When the process of Step S35 is finished or when the number of control channels for data assignment is not two or more at Step S34 (Step S34: NO), the control unit 24 determines whether the control channel is a downlink control channel (Step S36). In the process, when it is determined that the control channel is a downlink control channel (Step S36: YES), the control unit 24 receives a data channel for the device itself at the assignment location indicated by the control channel in the component carrier 300 specified at Step S35 (Step S37). On the other hand, when the control channel is not a downlink control channel (Step S36: NO), in other words, when the control channel is an uplink control channel, the control unit 24 transmits data at the assignment location indicated by the control channel in the specified component carrier 300 (Step S38).

When the process of Steps S37 and S38 is finished or when there is not a control channel for data assignment at Step S33 (Step S33: NO), the control unit 24 terminates the process on the transmission and reception of the control channel and the data channel.

As described above, according to the first embodiment, the base station 1 assigns a control channel at a location according to the component carrier 300 to which a data channel corresponding to this control channel is assigned. Therefore, because the terminal device 2 can identify which of the component carriers 300 the control channel corresponds to in accordance with the assignment location of the control channel, an amount of information of the control channel can be decreased. As a result, because the reduction of a data channel region can be prevented, frequency use efficiency can be improved.

When radio data communication is performed by using only one LTE system band in the LTE-Advanced system that performs communication by using a plurality of LTE system bands, a terminal device combines (blind decode) both of a control channel for LTE and a control channel for LTE-Advanced. By doing so, because a throughput increases and thus power consumption increases, a circuit for parallel processing can be separately provided in the terminal device in some cases. However, because one blind decode pattern is used by using the radio communication system S according to the first embodiment, a throughput can be reduced and also a circuit for parallel processing may not be provided in the terminal device.

Because information included in the control channel is similar to that of the conventional LTE system, the LTE-Advanced system has compatibility with a device that performs communication by using only one component carrier and thus a development overhead can be reduced when various types of devices according to the first embodiment are developed from these devices.

In the first embodiment, it has been explained about the case where the assignment of control channels to the control channel regions 310 is performed in an ascending order of frequency bands of the component carriers 300 corresponding to the control channels. However, the present invention is not limited to this. The assignment may be performed in a descending order to obtain a similar effect.

[b] Second Embodiment

Figure 10:
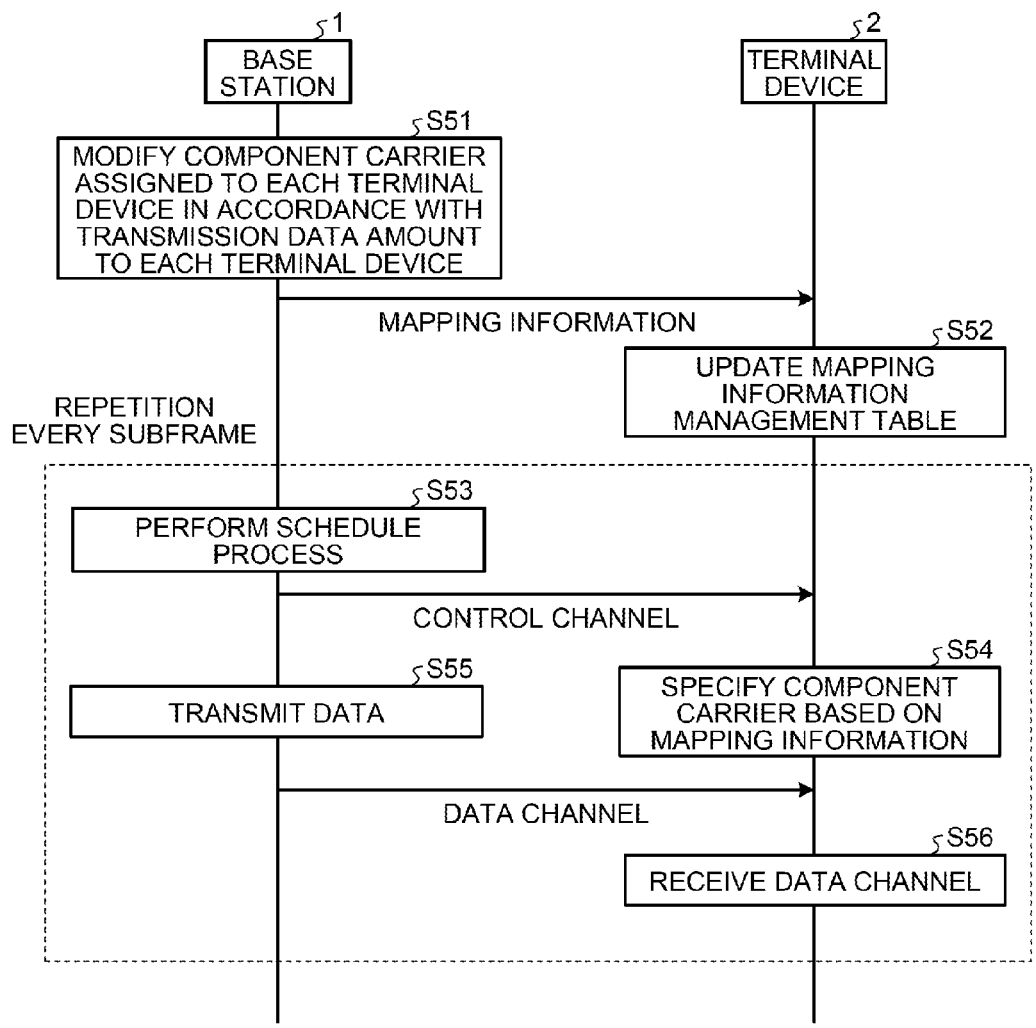
FIG. 10 is a diagram explaining a modification process of a component carrier to which a data channel is assigned according to a second embodiment.

According to the second embodiment, a correspondence relationship between the assignment location of a control channel and the component carrier 300 is changed in response to the request of the base station 1. As a result, even when data to be transmitted or received is concentrated on terminal devices that use a certain component carrier 300 as a main carrier, a wider range of the component carriers 300 can be used. It will be below explained about the flow of a modification process of a correspondence relationship between the assignment location of a control channel and a component carrier. FIG. 10 is a diagram explaining a modification process of a component carrier to which a data channel is assigned according to the second embodiment. In this case, the same configuration as that explained already has the same reference numbers, and their descriptions will not be repeated.

In the first embodiment, it has been explained about the case where the terminal device that receives the control channel of the component carrier #3 assigns only consecutive component carriers, which begin with the component carrier #3, such as "the component carrier #3", "the component carriers #3 and #4", and "the component carriers #3, #4, and #5". However, when data assignment is concentrated on, for example, the terminal device that uses the component carrier #3 as a main carrier, the component carrier #2 will not be effectively used even if the terminal device to which the component carrier #2 is assigned does not exist. Therefore, when transmission data is concentrated on the terminal device that uses a certain component carrier as a main carrier, the base station 1 performs signaling and modifies the assignment sequence of the data channels.

Specifically, as illustrated in FIG. 10, the carrier determining unit 120 of the base station 1 changes the component carrier 300 to which each data channel is assigned in accordance with a communication situation of each of the component carriers 300 to which a data channel is assigned (Step S51).

In other words, when data transmission is concentrated on, for example, the terminal device 2 that uses the component carrier #3 as a main carrier, the carrier determining unit 120 changes the component carriers #3, #4, and #5, to which the data channel of the certain terminal device 2 is assigned, to the component carriers #0, #1, and #2.

When a correspondence relationship between the assignment location of the control channel and the component carrier is modified by the carrier determining unit 120, the base station 1 transmits mapping information that indicates a correspondence relationship after modification to the terminal device 2.

When the mapping information is acquired, in other words, when information indicating the correspondence relationship after modification is acquired from the base station 1, the table updating unit 240 of the terminal device 2 updates the mapping information management table 230 on the basis of the information (Step S52).

Next, the control unit 12 of the base station 1 performs a schedule process on the basis of the correspondence relationship modified at Step S51 (Step S53), and transmits a control channel at an assignment location according to the scheduling result (Step S54). On the other hand, upon receiving the control channel, the carrier specifying unit 241 of the terminal device 2 specifies the component carrier 300 corresponding to each control channel on the basis of the mapping information updated at Step S52 (Step S54).

The control unit 12 of the base station 1 performs data transmission at a predetermined assignment location of each of the component carriers 300 determined as the component carrier 300 to which the data channel is assigned at Step S51 (Step S55). Then, the control unit 24 of the terminal device 2 receives a data channel for the device itself at the assignment location indicated by the acquired control channel in the data channel region 320 of the component carrier 300 specified at Step S54 (Step S56). In this case, the process of Steps S53 to S56 is repeatedly performed every subframe.

As described above, according to the second embodiment, because the correspondence relationship between the assignment location of a control channel and a component carrier is modified, the component carrier 300 can be more widely used even when data to be transmitted or received is concentrated on the plurality of terminal devices 2 that uses the certain component carrier 300 as a main carrier.

The above-described method is a solution when data transmission is concentrated in the short term. For example, the number of the terminal devices 2 that use the certain component carrier 300 as a main carrier may be largely different between the component carriers 300. In this case, a correspondence relationship may be modified between each of the terminal devices 2 and the component carrier 300 that is a main carrier.

[c] Third Embodiment

Figure 11:
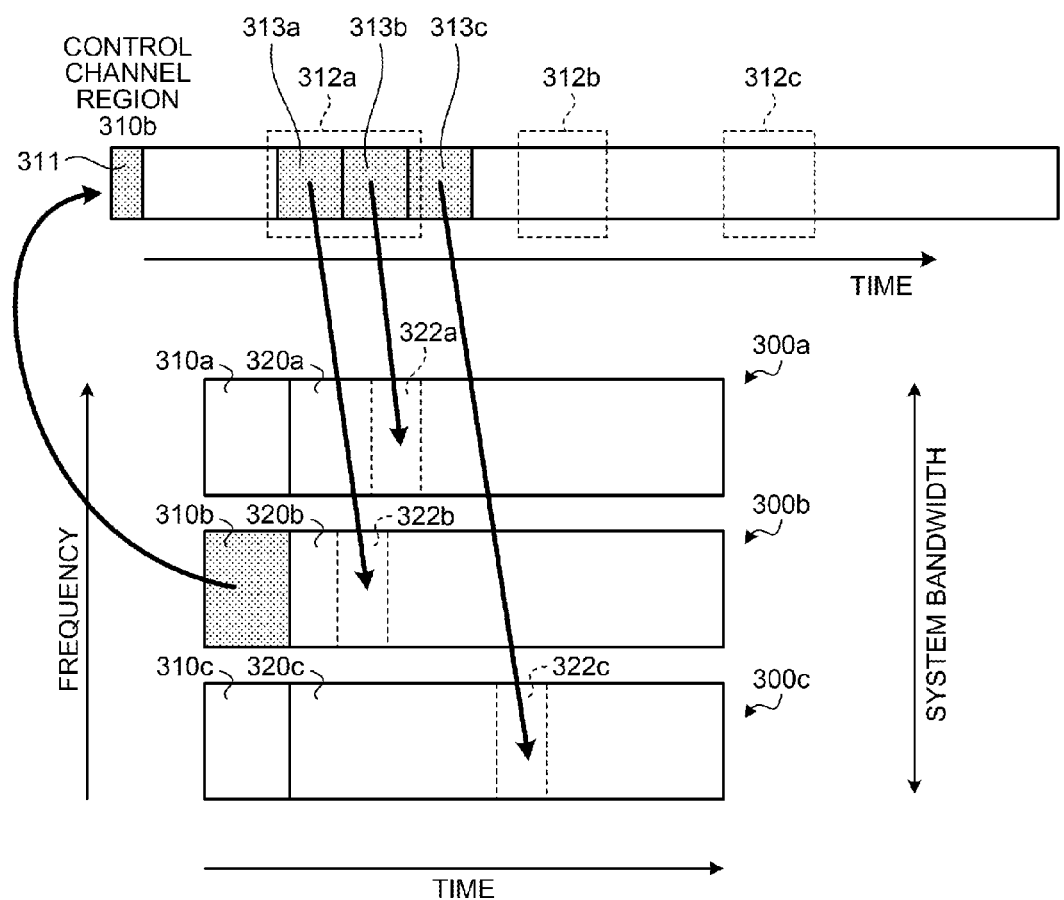
FIG. 11 is a diagram explaining a control channel assignment method according to a third embodiment.

In the first embodiment, it has been explained about the case where the terminal device 2 receives only a control channel in the search space 312. According to the third embodiment, a control channel is assigned to a space other than the search space 312. Hereinafter, it will be specifically explained about a control channel assignment method according to the third embodiment. FIG. 11 is a diagram explaining a control channel assignment method according to the third embodiment. In this case, the same configuration as that explained already has the same reference numbers, and their descriptions will not be repeated.

In the third embodiment, when a plurality of control channels is assigned as a control channel for the certain terminal device 2, the control channel assigning unit 121 of the base station 1 assigns each control channel a consecutive location in the control channel region 310 of the main carrier of the terminal device 2. For example, when the control channels 313*a* to 313*c* for the terminal device 2*b* are assigned, the control channel assigning unit 121 assigns the control channel 313*a* corresponding to the main carrier of the terminal device 2*b* in the search space 312*a* of the terminal device 2*b*.

Next, the control channel assigning unit 121 assigns the control channel 313*b* corresponding to the component carrier 300*a* having a high frequency band next to the main carrier, not in the search space 312*b*, but a continued location next to the control channel 313*a*. Moreover, the control channel assigning unit 121 assigns the control channel 313*c* corresponding to the component carrier 300c a continued location next to the control channel 313b. In this case, the control channel 313b can be larger than the search space 312a. The control channel assigning unit 121 assigns each of the control channels 313a to 313c in the control channel region 310 irrespective of the size of the search space 312.

On the other hand, the terminal device 2b first decodes the control channel in the search space 312a of the device itself similarly to the first embodiment. Then, upon detecting the control channel 313a for data assignment, the terminal device 2b decodes the control channel located at a continued location next to the control channel 313a.

At this time, the size of each control channel 313 may be previously set to the same value as that of the first detected control channel 313a. Generally, the more the number of the search spaces 312, the more false detection caused by blind decode. However, because the control channel 313 can be assigned to a space other than the search space 312 by using the aforementioned method, the assignment region of the control channel 313 is increased and thus a false detection probability of blind decode can be reduced.

There is a high possibility that the other control channel 313 exists at a continued location next to the control channel 313 that has been already detected. Therefore, the reception success probability of the control channel 313 can be raised by determining presence/absence thresholds of the control channel 313 when the terminal device 2 detects the control channel 313 on the assumption that the possibility of the presence of the control channel 313 is high (by determining that the control channel exists even if a signal level is low).

[d] Fourth Embodiment

Figure 12:
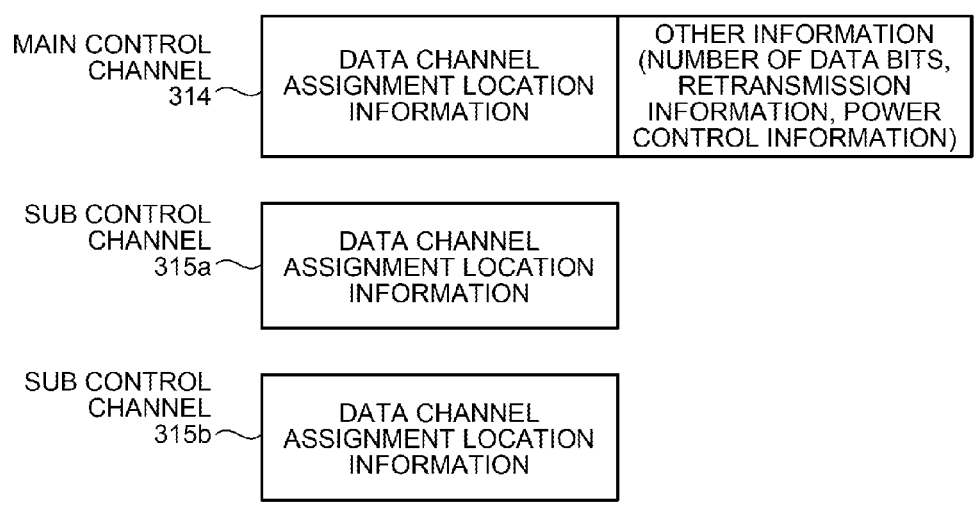
FIG. 12 is a diagram illustrating information included in a main control channel and a sub control channel according to a fourth embodiment.
Figure 13:
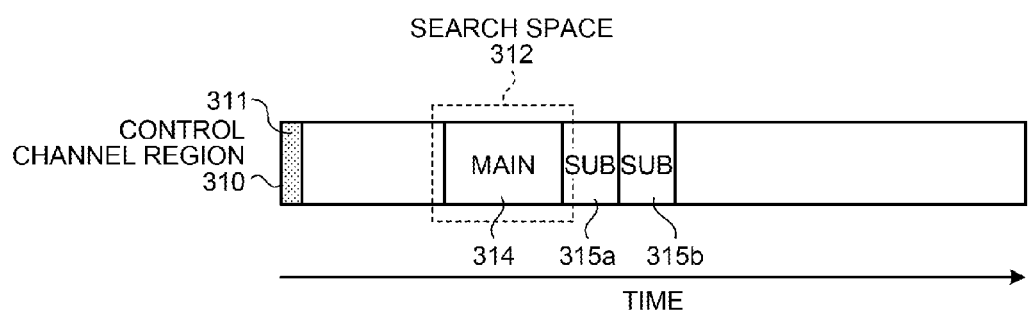
FIG. 13 is a diagram explaining an example of a control channel assignment method according to the fourth embodiment.

According to the fourth embodiment, main and sub control channels are provided and have the different numbers of bits. Hereinafter, it will be specifically explained about the configuration of main and sub control channels according to the fourth embodiment. FIG. 12 is a diagram illustrating information included in a main control channel and a sub control channel according to the fourth embodiment. FIG. 13 is a diagram explaining an example of a control channel assignment method according to the fourth embodiment. In this case, the same configuration as that explained already has the same reference numbers, and their descriptions are omitted.

As illustrated in FIG. 12, a main control channel 314 includes all information for data channel reception in addition to data channel assignment location information. For example, there are the number of bits of data, a modulation method, retransmission information, power control information, and the like as the other information. Moreover, sub control channels 315a and 315b include only data channel assignment information. The terminal device 2 uses the other information included in the main control channel 314 as information of the sub control channels 315a and 315b.

In this case, the main control channel 314 is assigned at the location first detected by the terminal device 2 in the control channel region 310 of the component carrier 300. As a result, the terminal device 2 first detects the main control channel 314, and uses the other information included in the main control channel 314 for the sub control channels 315a and 315b that are detected afterwards.

As described above, according to the fourth embodiment, because the sub control channel 315 includes only the data channel assignment location information and the other information included in the main control channel 314 is used for the sub control channel 315, the total number of bits of the control channel can be reduced.

For example, as illustrated in FIG. 13, the main control channel 314 and the sub control channel 315 can be assigned at continued locations in the control channel region 310 by previously setting the size of the main control channel 314 to two times of the size of the sub control channel 315. As a result, the same effect as that of the third embodiment can be obtained.

[e] Fifth Embodiment

According to the first to fourth embodiments described above, it has been explained about the case where it is previously decided that the component carriers 300 have the same control channel region identifier 311. This method is effective in that the operation of the terminal device 2 is simple. However, it is not possible to adjust the size of the control channel region 310 for each of the component carriers 300. Therefore, the component carrier 300 having few control channels for transmission includes an useless area and thus frequency use efficiency decreases. Therefore, the fifth embodiment changes the size of the control channel region 310 among the component carriers 300.

Figure 14:
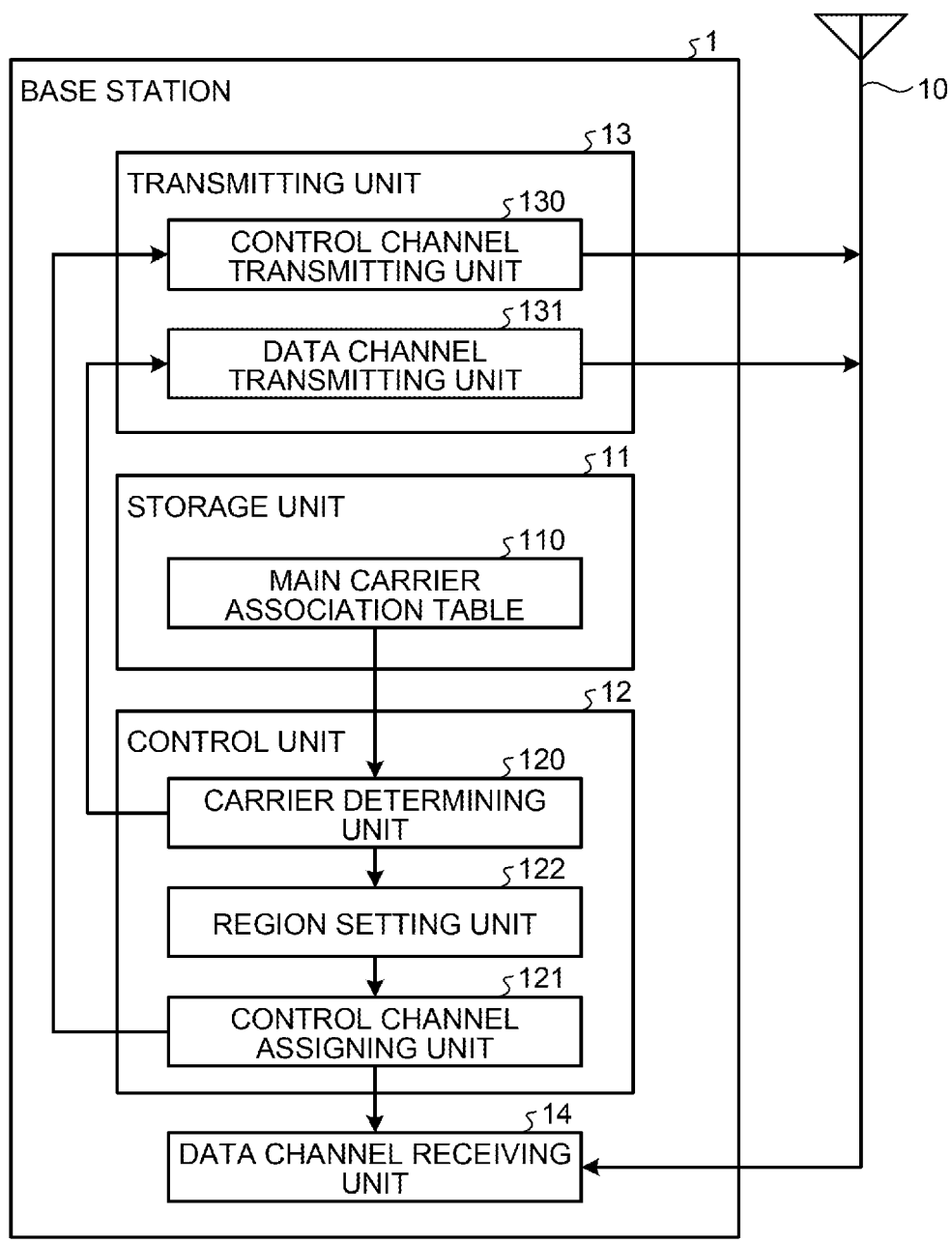
FIG. 14 is a block diagram illustrating the configuration of a base station according to a fifth embodiment.
Figure 15:
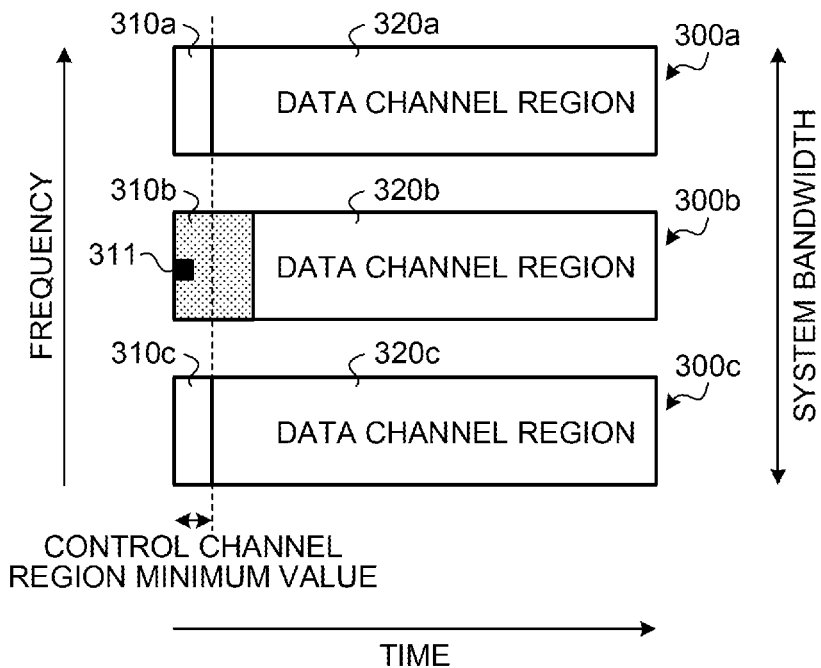
FIG. 15 is a diagram explaining a control channel region setting method according to the fifth embodiment.

Hereinafter, it will be specifically explained about a control channel region setting method according to the fifth embodiment. FIG. 14 is a block diagram illustrating the configuration of the base station according to the fifth embodiment. FIG. 15 is a diagram explaining a control channel region setting method according to the fifth embodiment. In this case, the same configuration as that explained already has the same reference numbers, and their descriptions will not be repeated.

As illustrated in FIG. 14, the control unit 12 of the base station 1 of the fifth embodiment includes a region setting unit 122. The region setting unit 122 sets the size of the control channel region 310 for each of the component carriers 300. In the fifth embodiment, the region setting unit 122 particularly sets the size of the control channel region of the component carrier 300 other than the main carrier to a value smaller than that of the control channel region 310 of the main carrier.

Specifically, the size of the control channel region 310 of each of the component carriers 300 can be modified stepwise. The region setting unit 122 sets the size of the control channel region 310 of the component carrier 300 other than the main carrier to the minimum value of the several steps.

For example, as illustrated in FIG. 15, when the component carrier 300b is a main carrier, a control channel corresponding to the component carrier 300a is assigned to the control channel region 310b of the component carrier 300b that is a main carrier. Therefore, the size of the control channel region 310a of the component carrier 300a may be smaller than that of the control channel region 310b of the component carrier 300b.

In this way, a useless area can be reduced by setting the size of the control data channel region of the component carrier 300 other than the main carrier to the minimum value. Moreover, because the data channel region 320 of the component carrier 300 other than the main carrier can be increased, frequency use efficiency is raised.

[f] Sixth Embodiment

Figure 16:
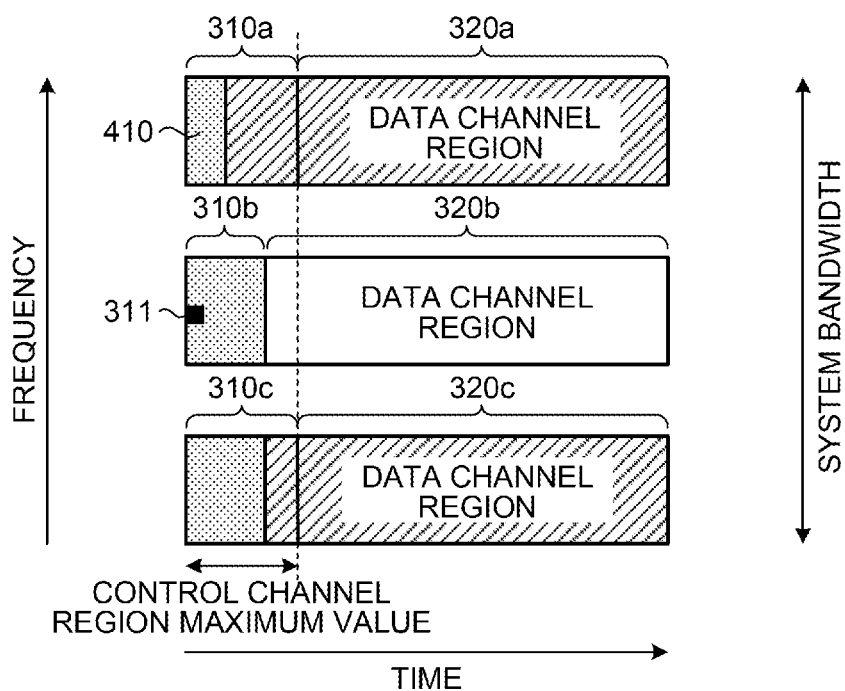
FIG. 16 is a diagram explaining a control channel region setting method according to a sixth embodiment.

According to the sixth embodiment, a data channel region is determined on the assumption that the possible, maximum value of the sizes of the control channel regions 310 is selected as the size of the control channel region 310 of the component carrier 300 to which a control channel is not assigned. Hereinafter, it is specifically explained about the setting method of the control channel region 310 according to the sixth embodiment. FIG. 16 is a diagram explaining a control channel region setting method according to the sixth embodiment. The same configuration as that explained already has the same reference numbers, and their descriptions will not be repeated.

In the sixth embodiment, the carrier determining unit 120 of the base station 1 determines the assignment location of a data channel in the data channel region 320 of each of the component carriers 300, assuming that the size of the control channel region 310 of the component carrier 300 other than the main carrier is set to the maximum size of the sizes that can be taken by the control channel regions 310.

For example, as illustrated in FIG. 16, when the component carrier 300b is a main carrier, the size of the control channel region 310b of the component carrier 300b is identified by the control channel region identifier 311. On the other hand, the sizes of the control channel regions 310a and 310c of the component carriers 300a and 300c are set to the maximum size of the sizes that can be taken by the control channel regions 310.

At this time, there is a high possibility that the sizes of the control channel regions 310a and 310c of the component carriers 300a and 300c are actually smaller than the set size. Therefore, for example, when data transmission is performed on the terminal device 2a that uses the component carrier 300a as a main carrier by using only the component carrier 300a, the size of a control channel region 410 can be determined in accordance with the size of the control channel for the terminal device 2a, and thus frequency use efficiency can be raised.

[g] Seventh Embodiment

Figure 17:
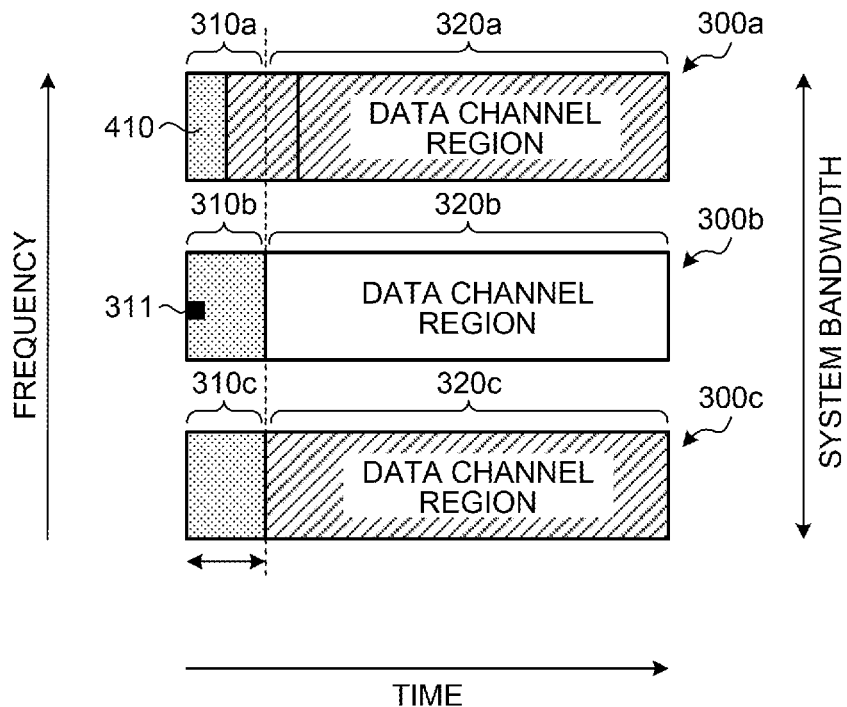
FIG. 17 is a diagram explaining a control channel region setting method according to a seventh embodiment.

Hereinafter, it is specifically explained about the setting method of the control channel region 310 according to the seventh embodiment. FIG. 17 is a diagram explaining a control channel region setting method according to the seventh embodiment. The same configuration as that explained already has the same reference numbers, and their descriptions will not be repeated. In the seventh embodiment, data channel assignment is performed on the assumption that the control channel region 310 having the same size as that of the main carrier is assigned to the other component carriers 300.

In the seventh embodiment, the carrier determining unit 120 determines the assignment location of a data channel in the data channel region of each of the component carriers 300, assuming that the sizes of the control channel regions 310 of the component carriers 300 other than the main carrier are the same as that of the control channel region 310 of the main carrier.

For example, as illustrated in FIG. 17, when the component carrier 300b is a main carrier, the size of the control channel region 310b of the component carrier 300b is identified by the control channel region identifier 311. On the other hand, the sizes of the control channel regions 310a and 310c of the component carriers 300a and 300c are set to the same as that of the control channel region 310b of the component carrier 300b.

As a result, when data transmission is performed on, for example, the terminal device 2a that uses the component carrier 300a as a main carrier by using only the component carrier 300a, the size of the control channel region 410 can be determined in accordance with the size of the control channel for the terminal device 2a and thus frequency use efficiency can be raised. Moreover, there is a high possibility that the sizes of the control channel regions 310 of the component carriers 300 other than the main carrier are smaller than that of the control channel region 310 of the main carrier. Therefore, it may be assumed that the sizes of the control channel regions 310 are not the maximum value like the sixth embodiment. The data channel region can be increased that much.

[h] Eighth Embodiment

Figure 18:
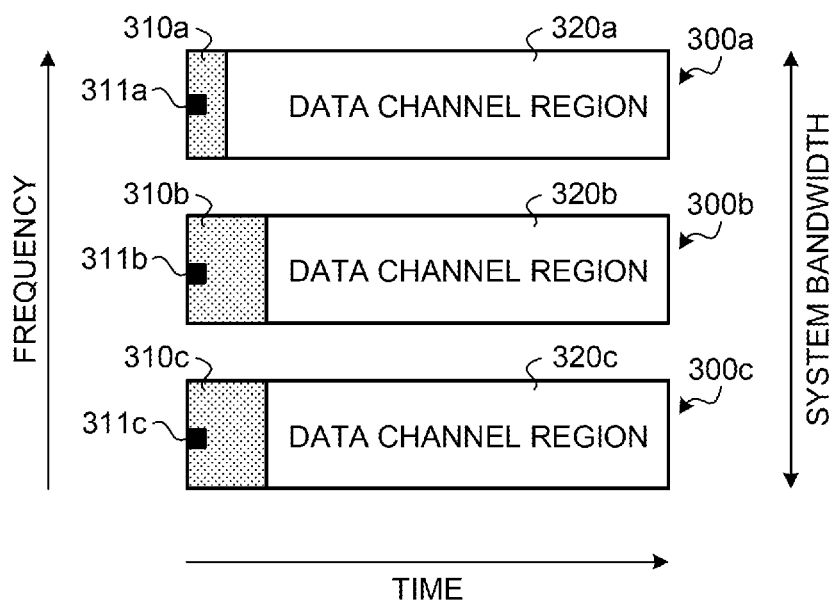
FIG. 18 is a diagram explaining a control channel region setting method according to an eighth embodiment.

Hereinafter, it is specifically explained about the setting method of the control channel region 310 according to the eighth embodiment. FIG. 18 is a diagram explaining a control channel region setting method according to the eighth embodiment.

In the eighth embodiment, each of the component carriers 300 independently sets the control channel region 310 and uses a remaining portion as the data channel region 320. Specifically, as illustrated in FIG. 18, control channel region identifiers 311a to 311c are respectively assigned to the control channel regions 310a to 310c of the component carriers 300a to 300c.

Figure 19:
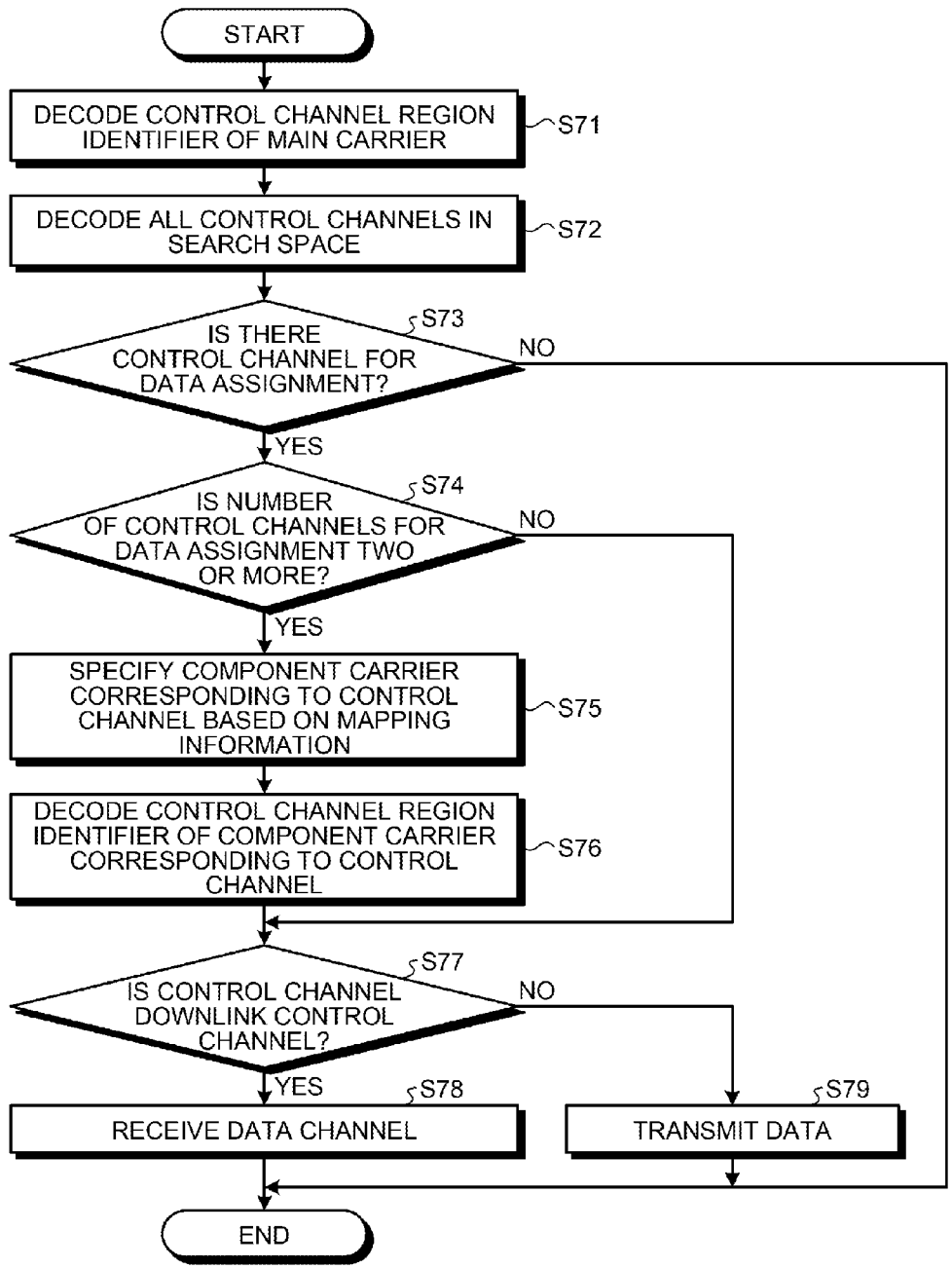
FIG. 19 is a flowchart illustrating an example of processing procedures performed by a terminal device according to the eighth embodiment.
Figure 20:
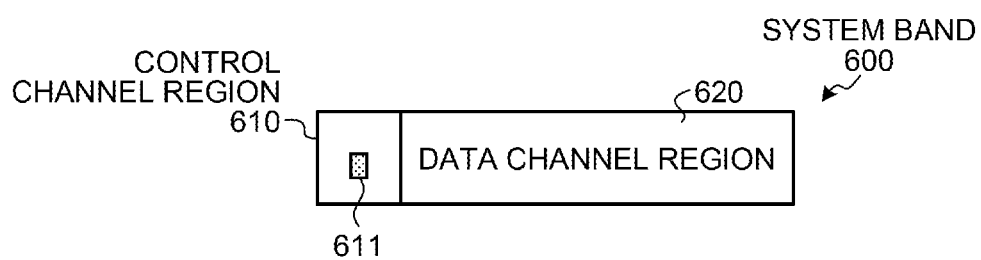
FIG. 20 is a diagram illustrating an example of a radio format of an LTE system.
Figure 21:
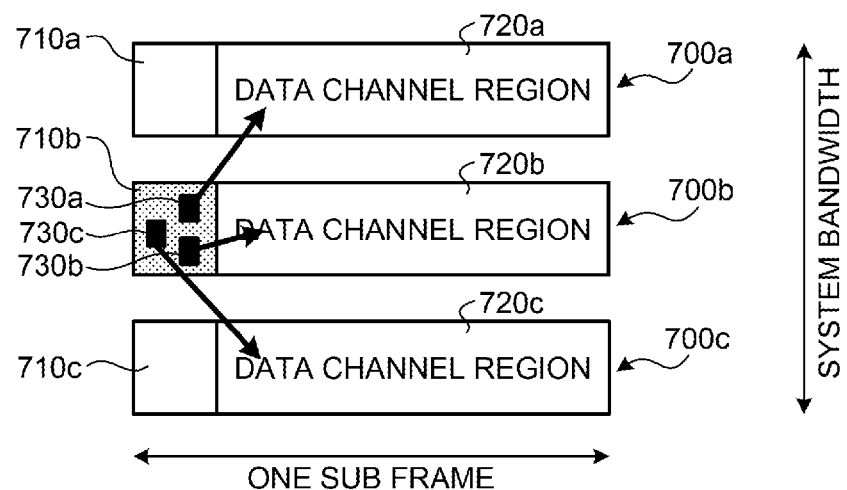
FIG. 21 is a diagram illustrating an example of a radio format of an LTE-Advanced system that is made by bundling three system bands of the LTE system.

It will be explained about the specific operations of the terminal device 2 according to the eighth embodiment. FIG. 19 is a flowchart illustrating an example of processing procedures performed by the terminal device 2 according to the eighth embodiment. The processing procedures other than Step S76 among the processing procedures of the terminal device 2 according to the eighth embodiment are similar to those of the terminal device 2 according to the first embodiment illustrated in FIG. 9, and their descriptions will not be repeated.

As illustrated in FIG. 19, when the component carrier 300 corresponding to each control channel is specified at Step S75, the control unit 24 of the terminal device 2 decodes the control channel region identifier 311 that is assigned to the control channel region 310 of each of the component carriers 300 (Step S76). As a result, the terminal device 2 can identify the size of the control channel region 310 of each of the component carriers 300.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

For example, it has been mainly explained about the assignment of a downlink data channel in the first to eighth embodiments described above. However, the present invention is applied to the assignment of an uplink data channel.

According to an embodiment of the present invention, the reduction of a data channel region can be prevented and frequency use efficiency can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station that performs radio data communication with terminal devices by using a plurality of bands of which each has a data channel region to which a data channel is assigned and a control channel region to which a control channel is assigned, the base station comprising:
   a control channel assigning unit that assigns a plurality of control channels for a terminal device at a plurality of locations within a control channel region of a band, the control channels corresponding to the bands and not including information indicating which of the bands the data channel assigned to the terminal device belongs to, each of the locations specifying one of the bands to which the data channel assigned to the terminal device belongs; and
   a control channel transmitting unit that transmits the control channels to the terminal device at the locations assigned by the control channel assigning unit.

2. The base station according to claim 1, wherein the control channel assigning unit assigns the control channels to the control channel region in any one of the plurality of bands in such a manner that a detection sequence of the control channels performed by the terminal device is identical to a sequence of frequency bands of the bands corresponding to the control channels.

3. The base station according to claim 2, wherein the control channel assigning unit sets the sequence of frequency bands of the bands corresponding to the control channels as an ascending order or a descending order of the frequency bands of the bands by using the band to which the control channel for the terminal device is assigned as a starting point.

4. The base station according to claim 3, wherein the control channel assigning unit sets a control channel detected by the terminal device next to the control channel corresponding to a band having the highest/lowest frequency band to a control channel corresponding to a band having the lowest/highest frequency band, as the detection sequence of the control channels performed by the terminal device.

5. The base station according to claim 1, further comprising a carrier determining unit that determines, among the plurality of bands, bands to which the data channel for each of the terminal devices is assigned in an ascending order or a descending order of frequency bands of the bands by using the band to which the control channel for the terminal device is assigned as a starting point.

6. The base station according to claim 5, wherein the carrier determining unit modifies a band to which the data channel is assigned in accordance with a communication situation of each of the bands to which the data channel is assigned.

7. The base station according to claim 2, wherein the control channel assigning unit assigns the control channels corresponding to the data channels at consecutive locations in the control channel region of the band to which the control channel for the terminal device is assigned.

8. The base station according to claim 1, wherein a control channel other than the control channel assigned at a location first detected by the terminal device, in the control channel region of the band to which the control channel for the terminal device is assigned, includes only information that indicates an assignment location of the data channel.

9. A terminal device that performs radio data communication with a base station by using a plurality of bands of which each has a data channel region to which a data channel is assigned and a control channel region to which a control channel is assigned, the terminal device comprising:
   a control channel receiving unit that receives, from the base station, a plurality of control channels assigned to a control channel region of a band to which the control channels for the terminal device are assigned, the control channels not including information indicating which of the bands the data channel assigned to the terminal device belongs to; and
   a data channel receiving unit that receives the data channel at an assignment location in the data channel region of the band specified by a location to which one of the received control channels is assigned.

10. The terminal device according to claim 9, further comprising:
   a storage unit that stores therein a band to which the control channel for the device itself is assigned among the plurality of bands and a correspondence relationship between the band and an assignment location of the control channel in the control channel region of the band; and
   an information updating unit that modifies, in accordance with a request of the base station, the correspondence relationship between the band and the assignment location of the control channel in the control channel region of the band stored in the storage unit to which the control channel for the device itself is assigned.

11. The terminal device according to claim 9, wherein the control channel receiving unit determines, upon receiving the control channel, that another control channel is assigned at an assignment location continued next to the assignment location of the control channel and receives the control channel at the continued assignment location.

12. A method for assigning a control channel to a control channel region by using a plurality of bands of which each has a data channel region to which a data channel is assigned and a control channel region to which a control channel is assigned when radio data communication is performed between a base station and a terminal device, the method comprising
   assigning, by the base station, a plurality of control channels for the terminal device at a plurality of locations within the control channel region of a band, the control channels corresponding to the bands and not including information indicating which of the bands the data channel assigned to the terminal device belongs to, each of the locations specifying one of the bands to which the data channel assigned to the terminal device belongs.

* * * * *